3,845,218
ALCOHOLIC FERMENTATION PROCESS
Dorsey R. Mussell, Clare, Mich., assignor to The Dow Chemical Company, Midland, Mich.
No Drawing. Filed Apr. 20, 1973, Ser. No. 353,157
Int. Cl. C12g 1/00, 3/00
U.S. Cl. 426—9                  5 Claims

ABSTRACT OF THE DISCLOSURE

Yeast fermentation of an aqueous sugar-containing solution to ethyl alcohol is improved by adding a minor amount of an O,O-dipropyl-phthalimidophosphonothioate thereto.

SUMMARY OF THE INVENTION

This invention concerns an improvement in a yeast-fermentation process for fermenting a fermentable aqueous sugar-containing solution to ethyl alcohol wherein the fermentation process is accelerated by adding to the said sugar solution from about 25 to about 200 parts per million (p.p.m.) and preferably from about 50 to about 200 p.p.m. by weight of an O,O-dipropyl-phthalimido- or an O,O-dipropyl-(4-methylphthalimido)phosphonothioate to a proportion of 100 ml. of a fermentable solution containing a sugar content of up to approximately 30 grams.

DESCRIPTION OF THE PREFERRED EMBODIMENTS

The saccharine substances which are fermentable in aqueous solution by yeasts of the *Saccharomyces cerevisiae* strains, including the *ellipsoideus* variety are derived from sugars, such as sucrose, glucose and lactose; i.e., derived from black strap, beet, corn and invert molasses; whey; sulfite waste liquor; sugar cane; cull fruits; grape juices; cannery wastes from fruits and vegetables; citrus-fruit juices; pineapple juice and the like. They may normally contain up to about 30 grams of sugar per 100 ml. or can be fortified to contain up to about 30 grams of sugar per 100 ml. In the practice of this invention, an aqueous solution or extract or juice of one or more of the above saccharine substances containing up to about 30 grams of sugar per 100 ml. is prepared in a conventional way and to the solution is added an inoculum of the yeast. The fermentation is allowed to continue similarly to that used in the wine-making industry, i.e., at about 25 to 26° C. Fermentation of the sugar to alcohol and carbon dioxide is monitored by periodically checking the sugar content with a Balling saccharometer. The fermentation is completed when the sugar content no longer decreases.

The following example further describes the invention and the manner and process of making and using it so as to enable any art skilled person to make and use the same, and sets forth the best mode contemplated by the inventor of carrying out the invention.

Example I.—Fermentation of Concord Grape Juice

Commercial Concord grape juice is adjusted to contain a sugar content of approximately 22 grams per 100 ml. The juice is divided into 700 ml. portions. An inoculum is prepared by adding yeast, *Saccharomyces cerevisiae* var. *ellipsoideus*, to 100 ml. of the grape juice to which sugar has been added to give a sugar concentration of ca. 22 g./100 ml. and allowed to ferment until ca. one half of the sugar has been fermented to ethanol and carbon dioxide. Seven ml. of this inoculum is added to each 700 ml. portion of sugar-fortified Concord grape juice. One of the compounds O,O-dipropyl-phthalimidophosphonothioate and O,O-dipropyl - (4 - methylphthalimido)phosphonothioate is added in varying proportions to individual batches of the inoculated fortified grape juice. A pure Concord grape juice control is similarly inoculated. Sugar concentrations of the fermenting grape juice media are determined before, during and after fermentation by means of a Balling saccharometer. Fermentation to alcohol is continued at ca. 25 to 26° C. An aliquot of the fermenting juice is drawn off 2 to 3 times daily for Balling saccharometer readings over an average fermentation time of seven days. The results obtained are given in the following table.

Amount of Sugar Converted, g./100 ml.

| Approx. hrs. of fermentation | Pure grape juice (total sugar=16 g./100 ml.) | | | Grape juice plus sucrose (total sugar= 22 g./100 ml.) | | | | |
|---|---|---|---|---|---|---|---|---|
| | 0 | 48 | 72 | 0 | 48 | 72 | 96 | 168 |
| Control | 0 | 8.0 | 10.5 | 0 | 7.0 | 10.0 | 15.0 | 20.0 |
| Compound A*: | | | | | | | | |
| 200 p.p.m | 0 | 15.0 | 15.5 | 0 | 14.5 | 19.5 | | |
| 100 p.p.m | 0 | 14.0 | 15.5 | 0 | 13.0 | 16.0 | | |
| 50 p.p.m | 0 | 9.5 | 11.0 | 0 | 10.5 | 13.5 | | |
| Compound B**: | | | | | | | | |
| 200 p.p.m | 0 | 12.0 | 14.0 | 0 | 10.5 | 12.0 | 20.0 | |
| 100 p.p.m | 0 | 11.0 | 14.5 | 0 | 10.0 | 12.0 | | |
| 50 p.p.m | 0 | 9.0 | 11.0 | 0 | 9.0 | 10.5 | | |
| 25 p.p.m | | | | | | 10.1 | | |

*Compound A=O,O-dipropyl-(4-methyl phthalimido)phosphonothioate.
**Compound B=O,O-dipropyl-phthalimidophosphonothioate.

The above procedure, when repeated with solutions derived from other saccharine sources as listed above, gives substantially similar accelerated fermentation of the sugar to ethyl alcohol and carbon dioxide.

What is claimed is:

1. In a yeast-fermentation process for fermenting an aqueous fermentable sugar-containing solution to ethyl alcohol, the improvement whereby the fermentation is accelerated which comprises adding to the sugar solution containing up to about 30 grams of said sugar per 100 ml. of solution from about 25 to about 200 parts per million by weight of an O,O-dipropyl-phthalimidophosphonothioate or an O,O-dipropyl-(4-methylphthalimido) phosphonothioate, inoculating said solution with a yeast which ferments sugar to ethanol and allowing fermentation to proceed until fermentation of sugar to ethanol is substantially completed.

2. The process of Claim 1 wherein the said phthalimidophosphonothioate is added in amount from about 50 to about 200 parts per million by weight.

3. The process of Claim 2 whereing the aqueous fermentable sugar-containing solution is Concord grape juice to which sucrose has been added to provide about 22 grams of sugar per 100 ml. of fermentable solution, inoculating said solution with *Saccharomyces cerevisiae* var. *ellipsoideus* and allowing fermentation to proceed until fermentation of the sugar to ethanol is substantially completed.

4. The process of Claim 2 wherein the compound added to the solution is O,O-dipropyl-phthalimidophosphonothioate.

5. The process of Claim 2 wherein the compound added to the solution is O,O-dipropyl-(4-methylphthalimido)phosphonothioate.

References Cited

UNITED STATES PATENTS

| | | | |
|---|---|---|---|
| 2,964,406 | 12/1960 | Strandskov et al. | 195—123 X |
| 1,816,441 | 7/1931 | Peet | 195—123 |
| 3,404,006 | 10/1968 | Malick | 99—35 |

OTHER REFERENCES

Tolkmith et al., Fungicidal Phthalimidophosphonothionates. Science, vol. 155, 1967 (pp. 85 & 86) Q1534.

DAVID M. NAFF, Primary Examiner

U.S. Cl. X.R.

195—37, 123; 426—11, 15